(12) United States Patent
Jung et al.

(10) Patent No.: US 11,322,309 B2
(45) Date of Patent: May 3, 2022

(54) TANTALUM CAPACITOR

(71) Applicant: SAMSUNG ELECTRO-MECHANICS CO., LTD., Suwon-si (KR)

(72) Inventors: Hun Choi Jung, Suwon-si (KR); Wan Suk Yang, Suwon-si (KR); Tae Hun Kang, Suwon-si (KR); Yeong Su Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 26 days.

(21) Appl. No.: 16/881,189

(22) Filed: May 22, 2020

(65) Prior Publication Data

US 2021/0159021 A1    May 27, 2021

(30) Foreign Application Priority Data

Nov. 27, 2019   (KR) .......................... 10-2019-0154373

(51) Int. Cl.
*H01G 9/012* (2006.01)
*H01G 9/15* (2006.01)
*H01G 9/08* (2006.01)

(52) U.S. Cl.
CPC ............ *H01G 9/012* (2013.01); *H01G 9/08* (2013.01); *H01G 9/15* (2013.01)

(58) Field of Classification Search
CPC .................................................... H01G 9/012
See application file for complete search history.

(56) References Cited

U.S. PATENT DOCUMENTS

| 4,831,490 | A |   | 5/1989 | Voeten et al. |
| 2015/0036265 | A1 | * | 2/2015 | Shin ...................... H01G 9/10 361/529 |
| 2015/0077905 | A1 | * | 3/2015 | Shin ...................... H05K 1/181 361/529 |
| 2015/0194269 | A1 | * | 7/2015 | Fujii ...................... B32B 37/04 361/528 |
| 2016/0260548 | A1 | * | 9/2016 | Shin ...................... H01G 9/26 |
| 2017/0271087 | A1 | * | 9/2017 | Aoyama ................ H01G 9/052 |

FOREIGN PATENT DOCUMENTS

| JP | 2012222262 A | * | 11/2012 | ............. H01G 9/012 |
| KR | 20-0307570 Y1 |   | 3/2003 |   |
| WO | WO-2014068923 A1 | * | 5/2014 | ............... H01G 9/10 |

* cited by examiner

*Primary Examiner* — Eric W Thomas
(74) *Attorney, Agent, or Firm* — Morgan, Lewis & Bockius LLP

(57) ABSTRACT

A tantalum capacitor includes: a tantalum body including tantalum, and having a tantalum wire in which a distance from a lower surface of the tantalum body is closer than a distance from an upper surface of the tantalum body; an insulating member on which the tantalum body is disposed; an encapsulation portion; an anode terminal including an upper anode and connected to the tantalum wire, a lower anode pattern, and an anode connection portion connecting the upper anode pattern and the lower anode pattern; and a cathode terminal including an upper cathode pattern and connected to the tantalum body, a lower cathode pattern disposed on a lower surface of the insulating member to be spaced apart from the lower anode pattern, and a cathode connection portion connecting the upper cathode pattern and the lower cathode pattern.

21 Claims, 3 Drawing Sheets

TANTALUM CAPACITOR

CROSS-REFERENCE TO RELATED APPLICATION

This application claims the benefit of priority to Korean Patent Application No. 10-2019-0154373 filed on Nov. 27, 2019, with the Korean Intellectual Property Office, the disclosure of which is incorporated herein by reference.

BACKGROUND

The present disclosure relates to a tantalum capacitor.

A tantalum (Ta) material is a metal having mechanical or physical characteristics such as a high melting point, excellent ductility and excellent corrosion-resistance, and is widely used in various fields throughout industries such as the electrical, electronic, mechanical, chemical, aerospace, and defense industries.

Since the tantalum material may form a stable anodic oxide film, tantalum has been widely used as a material in forming anodes for small capacitors. Recently, in accordance with the rapid development of information technology (IT) industries, such as electronics information and communications technology (ICT) and electronics technology, tantalum has been increasingly used on a year-on-year basis.

The tantalum capacitor is used in passive component-intensive products such as TVs, smartphones, notebook computers, tablet PCs, and automotive electronic components, and recently, due to the slimness of passive component-intensive products, tantalum capacitors have also become smaller, and due to the enlargement of the display, high capacity is required due to an increase in the battery capacity due to the application of an AP (Application Processor).

SUMMARY

An aspect of the present disclosure is to provide a tantalum capacitor capable of minimizing the number of processes required during manufacturing by simplifying a structure while securing high capacity with a frameless structure.

According to an aspect of the present disclosure, a tantalum capacitor includes: a tantalum body including tantalum, and having a tantalum wire in which a distance from a lower surface of the tantalum body is positioned to be closer than a distance from an upper surface of the tantalum body, the tantalum wire being exposed through one end surface; an insulating member, the tantalum body being disposed on an upper surface of the insulating member; an encapsulation portion encapsulating the tantalum body; an anode terminal including an upper anode pattern disposed on the upper surface of the insulating member and connected to the tantalum wire, a lower anode pattern disposed on a lower surface of the insulating member, and an anode connection portion connecting the upper anode pattern and the lower anode pattern; and a cathode terminal including an upper cathode pattern disposed on the upper surface of the insulating member and connected to the tantalum body, a lower cathode pattern disposed on the lower surface of the insulating member to be spaced apart from the lower anode pattern, and a cathode connection portion connecting the upper cathode pattern and the lower cathode pattern.

In one embodiment of the present disclosure, a conductive adhesive portion disposed to be connected to the tantalum wire above the upper anode pattern may be further included.

In one embodiment of the present disclosure, the conductive adhesive portion may include an epoxy-based thermosetting resin and a conductive metal powder.

In one embodiment of the present disclosure, an end portion of the tantalum wire may be bent downwardly to the anode terminal.

In one embodiment of the present disclosure, a non-insertion region of the tantalum wire may have a first region extending from the one end surface of the tantalum body and a second region connected to the upper anode pattern, and the first region and the second region may be in a stepwise manner.

In an embodiment of the present disclosure, the anode connection portion may include an anode via electrode penetrating the insulating member to connect the upper anode pattern and the lower anode pattern, and the cathode connection portion may include a cathode via electrode penetrating the insulating member to connect the upper cathode pattern and the lower cathode pattern.

In an embodiment of the present disclosure, the anode via electrode may be a portion convexly bent downwardly to the lower anode pattern so that a portion of the upper anode pattern is connected to the lower anode pattern, and the cathode via electrode may a portion convexly bent downwardly to the lower cathode pattern so that a portion of the upper cathode pattern is connected to the lower cathode pattern.

In an embodiment of the present disclosure, each of a width of the upper anode pattern and a width of the upper cathode pattern may be smaller than a width of the insulating member.

In an embodiment of the present disclosure, each of a width of the lower anode pattern and a width of the lower cathode pattern may be smaller than a width of the insulating member.

In an embodiment of the present disclosure, a conductive adhesive layer disposed between the tantalum body and the upper cathode pattern may be further included.

In an embodiment of the present disclosure, the conductive adhesive layer may include an epoxy-based thermosetting resin and a conductive metal powder.

According to an aspect of the present disclosure, a tantalum capacitor includes: a tantalum body including tantalum, and having a tantalum wire including one region disposed in the tantalum body and another region extending from one end surface of the tantalum body; an insulating member, on which the tantalum body is disposed; an encapsulation portion encapsulating the tantalum body; an anode terminal including an upper anode pattern disposed on an upper surface of the insulating member and connected to the tantalum wire, a lower anode pattern disposed on a lower surface of the insulating member, and an anode via electrode disposed in a first hole in the insulating member to connect the upper anode pattern and the lower anode pattern; and a cathode terminal including an upper cathode pattern disposed on the upper surface of the insulating member and connected to the tantalum body, a lower cathode pattern disposed on the lower surface of the insulating member, and a cathode via electrode disposed in a second hole in the insulating member to connect the upper cathode pattern and the cathode anode pattern.

In an embodiment of the present disclosure, the tantalum capacitor may further include a first conductive adhesive portion connecting the tantalum wire to the upper anode pattern, and a second conductive adhesive portion connecting the tantalum body to the upper cathode pattern.

In an embodiment of the present disclosure, each of the first and second conductive adhesive portions may include an epoxy-based thermosetting resin and a conductive metal powder.

In an embodiment of the present disclosure, a portion of the first conductive adhesive portion may be disposed in the first hole, and a portion of the second conductive adhesive portion may be disposed in the second hole.

In an embodiment of the present disclosure, the encapsulation portion may encapsulate the first conductive adhesive portion and the second conductive adhesive portion.

In an embodiment of the present disclosure, the another region of the tantalum wire may have an end portion bent toward the upper anode pattern.

In an embodiment of the present disclosure, each of a width of the upper anode pattern and a width of the lower upper cathode pattern may be narrower than a width of the insulating member.

In an embodiment of the present disclosure, each of a width of the lower anode pattern and a width of the lower cathode pattern may be narrower than a width of the insulating member.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
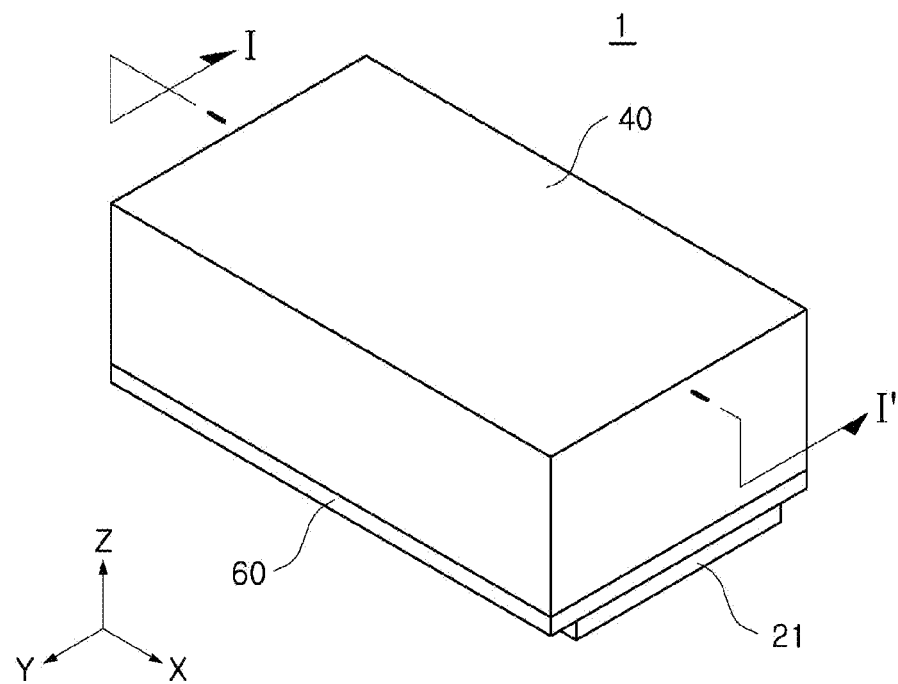
FIG. 1 is a perspective view schematically illustrating a tantalum capacitor according to an embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In addition, when the direction is defined to clearly describe embodiments of the present disclosure, X, Y and Z illustrated in the drawings represent a length direction, a width direction and a thickness direction of the tantalum capacitor, the encapsulation portion, and the tantalum body respectively.

In addition, in the drawings, surfaces opposing each other in the X direction are set as both end surfaces, surfaces opposing each other in the Y direction are set to both side surfaces, and surfaces opposing each other in the Z direction are set to upper and lower surfaces, respectively.

Figure 2:
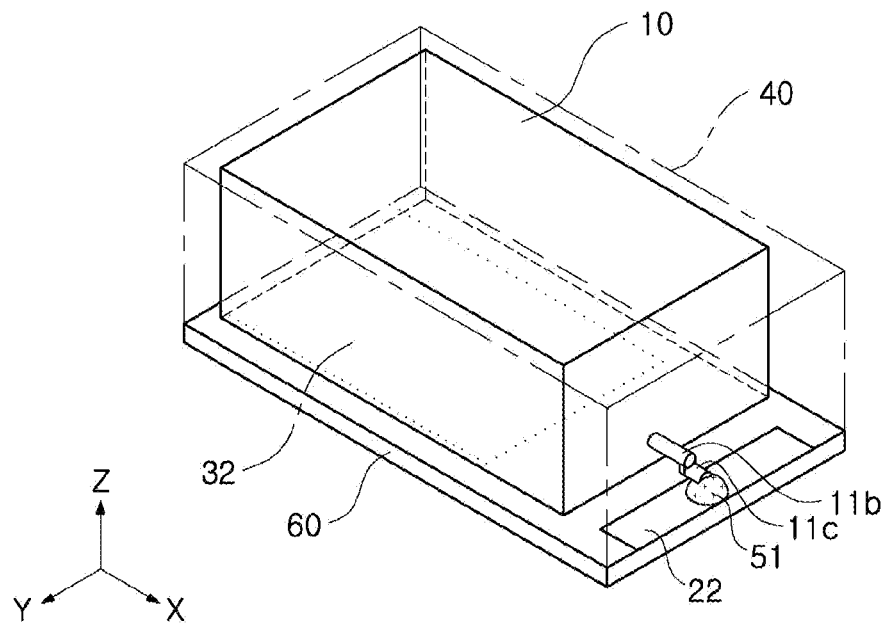
FIG. 2 is a transparent perspective view of a tantalum body, a tantalum wire, an encapsulation portion, an upper anode pattern, a conductive adhesive, and an insulating member in FIG. 1.
Figure 3:
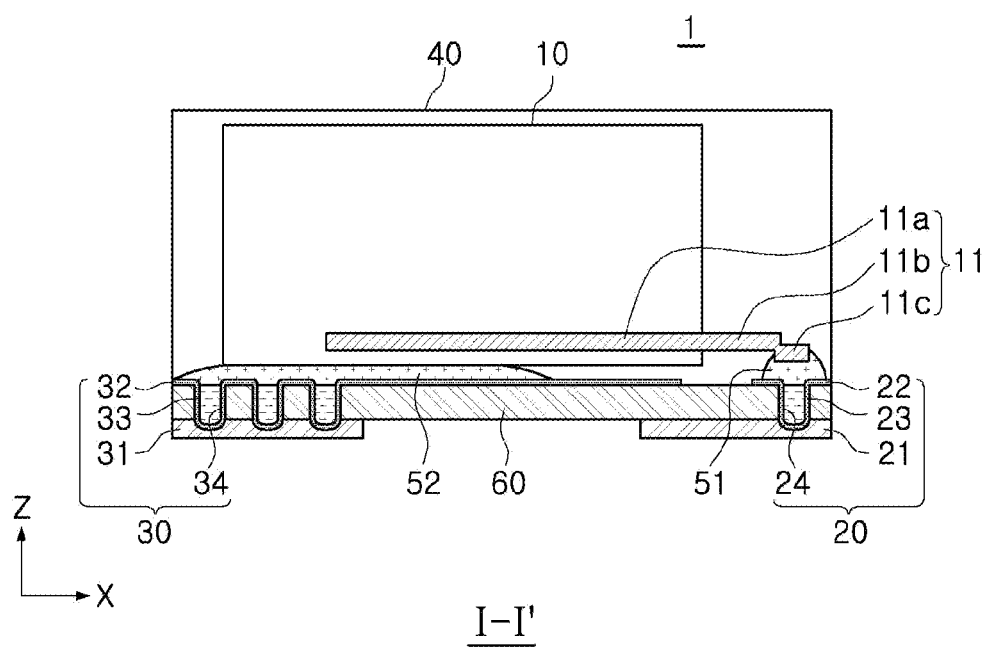
FIG. 3 is a cross-sectional view taken along line I-I' in FIG. 1.
Figure 4:
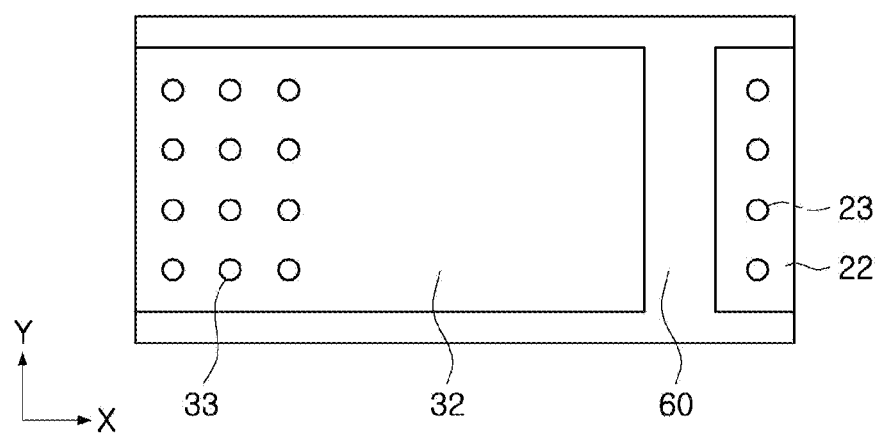
FIG. 4 is a plan view illustrating an insulating member, an upper anode pattern, and an upper cathode pattern in FIG. 1.
Figure 5:
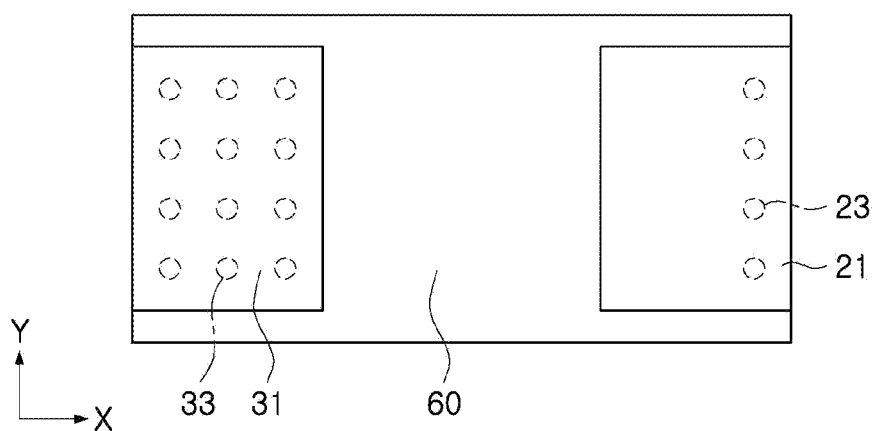
FIG. 5 is a bottom view of FIG. 1.

FIG. 1 is a perspective view schematically illustrating a tantalum capacitor according to an embodiment of the present disclosure, FIG. 2 is a transparent perspective view of a tantalum body, a tantalum wire, an encapsulation portion, an upper anode pattern, a conductive adhesive, and an insulating member in FIG. 1, FIG. 3 is a cross-sectional view taken along line I-I' in FIG. 1, FIG. 4 is a plan view illustrating an insulating member, an upper anode pattern, and an upper cathode pattern in FIG. 1, and FIG. 5 is a bottom view of FIG. 1.

Referring to FIGS. 1 to 5, a tantalum capacitor 1 according to the present embodiment includes a tantalum body 10, an insulating member 60, an encapsulation portion 40, an anode terminal 20, and a cathode terminal 30.

The tantalum body 10 may be prepared by mixing and stirring a tantalum powder and a binder at a certain ratio, compressing the mixed powder into a generally rectangular parallelepiped form, and then sintering it in a high vacuum ($10^{-5}$ torr or less) atmosphere of 1,000 to 2,000° C.

The tantalum body 10 has a tantalum wire 11 exposed through one end surface in the X direction.

The tantalum wire 11 may be mounted on the tantalum body 10 by inserting it into a mixture of a tantalum powder and a binder so as to be eccentric from a center before compressing the mixed powder when manufacturing the tantalum body 10.

In the present embodiment, the tantalum wire 11 is disposed to be adjacent to a lower surface of the tantalum body 10.

Accordingly, the tantalum wire 11 is configured such that a distance from a lower surface of the tantalum body 10 is positioned to be closer than a distance from an upper surface of the tantalum body 10 in the Z direction.

In addition, the tantalum wire 11 may be divided into an insertion region 11a inserted into the tantalum body 10 and a non-insertion region exposed outside of the tantalum body 10.

The non-insertion region may include a first region 11b extending from one end surface of the tantalum body 10 and a second region 11c extending further in an X direction at an end portion of the first region 11b and connected to the anode terminal 20.

In this case, the second region 11c of the tantalum wire 11 may be formed to be bent downwardly in the Z direction from the end portion of the first region 11b.

In addition, the second region 11c of the tantalum wire 11 may be formed such that an upper surface thereof is stepped from the first region 11b.

Accordingly, the second region 11c of the tantalum wire 11 may be more easily in contact with an upper anode pattern of the anode terminal 20 to be described later.

An insulating member 60 is provided with a tantalum body 10 on an upper surface thereof.

The insulating member 60 may be made of an insulator, such as FR4.

An encapsulation portion 40 encapsulates the tantalum body 10.

The encapsulation portion 40 may be formed by transfer molding a resin such as an epoxy molding compound (EMC), or the like, to surround the tantalum body 10.

The encapsulation portion 40 may serve to protect the tantalum wire 11 and the tantalum body 10 from the outside.

An anode terminal 20 is made of a conductive metal, and includes an upper anode pattern 22, a lower anode pattern 21, and an anode connection portion 23.

The upper anode pattern 22 is disposed on the upper surface of the insulating member 60 to be connected to the tantalum wire 11.

In this case, the second region 11c of the tantalum wire 11 may be connected to the upper anode pattern 22, and when the second region 11c is bent downwardly, the second region 11c of the tantalum wire 11 and the upper anode pattern 22 are easily connected with each other. In one example, the second region 11c of the tantalum wire 11 may be in contact with the upper anode pattern 22, and when the second region 11c is bent downwardly, the second region 11c of the tantalum wire 11 and the upper anode pattern 22 are easily in contact with each other.

In addition, a width of the upper anode pattern 22 in the Y direction may be narrower than a width of the insulating member 60 in the Y direction.

In addition, a conductive adhesive portion 51 may be disposed on the upper anode pattern 22 to be connected to the second region 11c of the tantalum wire 11.

The conductive adhesive portion 51 may include an epoxy-based thermosetting resin and a conductive metal powder.

The conductive metal powder may be Ag (silver), and the present disclosure is not limited thereto.

A lower anode pattern 21 is disposed on the lower surface of the insulating member 60, and serves to electrically connect the tantalum capacitor 1 of the present disclosure when mounted on a substrate or the like.

In this case, a width of the lower anode pattern 21 in the Y direction may be narrower than a width of the insulating member 60 in the Y direction.

The anode connection portion 23 connects the upper anode pattern 22 and the lower anode pattern 21 to each other.

In addition, the anode connection portion 23 may be an anode via electrode penetrating the insulating member 60 in the Z direction to connect the upper anode pattern 22 and the lower anode pattern 21.

The anode via electrode may be formed of a portion that is convexly bent downwardly so that a portion of the upper anode pattern 22 is connected to the lower anode pattern 21.

In this case, a portion of the conductive adhesive forming a conductive adhesive portion on an inner side 24 of the anode via electrode may be filled, such that a bonding force of the anode terminal 20 may be improved.

A cathode terminal 30 is made of a conductive metal, and includes an upper cathode pattern 32, a lower cathode pattern 31 and a cathode connection portion 33.

The upper cathode pattern 32 is disposed on the upper surface of the insulating member 60 to be spaced apart from the upper anode pattern 22 in the X direction, to be connected to the tantalum body 10.

In addition, a width of the upper cathode pattern 32 in the Y direction may be narrower than a width of the insulating member 60 in the Y direction.

In this case, a conductive adhesive layer 52 may be disposed between the tantalum body 10 and the upper cathode pattern 32.

The conductive adhesive layer 52 may include an epoxy-based thermosetting resin and a conductive metal powder.

The conductive metal powder may be Ag (silver), and the present disclosure is not limited thereto.

A lower cathode pattern 31 is disposed to be spaced apart in the X direction from the lower anode pattern 21 on the lower surface of the insulating member 60, and serves to electrically connect the tantalum capacitor 1 of the present disclosure when mounted on a substrate or the like.

In addition, a width of the lower cathode pattern 31 in the Y direction may be narrower than a width of the insulating member 60 in the Y direction.

A cathode connection portion 33 connects the upper cathode pattern 32 and the lower cathode pattern 31 to each other.

In addition, the cathode connection portion 33 may be a cathode via electrode penetrating the insulating member 60 in the Z direction to connect the upper cathode pattern 32 and the lower cathode pattern 31.

The cathode via electrode may be formed of a portion that is convexly bent downwardly so that a portion of the upper cathode pattern 32 is connected to the lower anode pattern 31.

In this case, a portion of a conductive adhesive forming a conductive adhesive layer on an inner side 34 of the cathode via electrode may be filled, so that a bonding force of the cathode terminal 30 may be improved.

In the present embodiment, since the upper cathode pattern 32 is connected to the lower cathode pattern 31 by the cathode via electrode 33 at a shortest distance, a current path may decrease to reduce ESR of the tantalum capacitor 1.

Conventional tantalum capacitors are divided into having a lower electrode structure and a frameless structure.

In the tantalum capacitor of the lower electrode structure, an anode terminal and a cathode terminal are disposed only on a lower surface of an encapsulation portion, such that an anode terminal penetrates the encapsulation portion vertically, and is connected to the tantalum wire, and the tantalum body is mounted on the cathode terminal.

In the frameless structure of the tantalum capacitor, a lower cathode pattern and an anode pattern are formed on the lower surface of the insulating member, and an upper cathode pattern is formed on the upper surface of the insulating member to face the lower cathode pattern.

The tantalum body is mounted on the upper cathode pattern, and sputtering and electroplating are performed on one end surface of the encapsulation portion to connect the upper and lower cathode patterns to each other.

In addition, the tantalum wire is exposed through the other end surface of the encapsulation portion, and sputtering and electroplating are performed on the other end surface of the encapsulation portion to connect the lower anode pattern and the tantalum wire to each other.

Since the tantalum capacitor having the frameless structure configured as described above can increase a volume more than the tantalum capacitor having the low electrode structure under the same size, the capacity may be further improved.

However, the tantalum capacitor of the frameless structure is relatively disadvantageous in terms of manufacturing cost because the structure is more complicated and requires additional processing during manufacturing compared to the tantalum capacitor of the lower electrode structure.

The tantalum capacitor of the present embodiment can provide an excellent tantalum body volume ratio of a frameless structure, and since a dicing process of a conventional frameless structure, sputtering and electroplating for connecting the upper and lower cathode patterns, and sputtering and electroplating for connecting the lower anode pattern and tantalum wires are not required, the number of processes during manufacturing can be reduced, such that manufacturing costs can be significantly reduced compared to a tantalum capacitor of the conventional frameless structure.

As set forth above, according to an embodiment of the present disclosure, since it secures high capacity with a frameless structure, and does not require sputtering and plating on both end surfaces of the encapsulation portion, a structure may be simplified, thereby minimizing the number of processes in manufacturing a tantalum capacitor.

However, various and advantageous advantages and effects of the present disclosure are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor, comprising:
a tantalum body including tantalum and having a tantalum wire, a distance from a lower surface of the tantalum body to the tantalum wire being less than a distance from an upper surface of the tantalum body to the tantalum wire, the tantalum wire being exposed through one end surface of the tantalum body;
an insulating member, the tantalum body being disposed on an upper surface of the insulating member;
an encapsulation portion encapsulating the tantalum body;
an anode terminal including an upper anode pattern disposed on the upper surface of the insulating member and connected to the tantalum wire, a lower anode pattern disposed on a lower surface of the insulating member, and an anode connection portion connecting the upper anode pattern and the lower anode pattern; and
a cathode terminal including an upper cathode pattern disposed on the upper surface of the insulating member and connected to the tantalum body, a lower cathode pattern disposed on the lower surface of the insulating member to be spaced apart from the lower anode pattern, and a cathode connection portion connecting the upper cathode pattern and the lower cathode pattern,
wherein an exposed portion of the tantalum wire includes a first region and a second region, the second region having an upper surface stepped from an upper surface of the first region, and
wherein the exposed portion further includes a transition region connecting the first and second regions, the transition region having a thickness greater than those of the first and second regions.

2. The tantalum capacitor of claim 1, further comprising a conductive adhesive portion disposed above the upper anode pattern to be connected to the tantalum wire.

3. The tantalum capacitor of claim 2, wherein the conductive adhesive portion comprises an epoxy-based thermosetting resin and a conductive metal powder.

4. The tantalum capacitor of claim 1, wherein an end portion of the tantalum wire is bent downwardly to the anode terminal.

5. The tantalum capacitor of claim 1, wherein a non-insertion region of the tantalum wire has a first region extending from the one end surface of the tantalum body and a second region connected to the upper anode pattern, and the first region and the second region is in a stepwise manner.

6. The tantalum capacitor of claim 1, wherein the anode connection portion includes an anode via electrode penetrating the insulating member to connect the upper anode pattern and the lower anode pattern, and
the cathode connection portion includes a cathode via electrode penetrating the insulating member to connect the upper cathode pattern and the lower cathode pattern.

7. The tantalum capacitor of claim 6, wherein the anode via electrode is a portion convexly bent downwardly to the lower anode pattern so that a portion of the upper anode pattern is connected to the lower anode pattern, and
the cathode via electrode is a portion convexly bent downwardly to the lower cathode pattern so that a portion of the upper cathode pattern is connected to the lower cathode pattern.

8. The tantalum capacitor of claim 1, wherein each of a width of the upper anode pattern and a width of the lower anode pattern is smaller than a width of the insulating member.

9. The tantalum capacitor of claim 1, wherein each of a width of the lower anode pattern and a width of the lower cathode pattern is smaller than a width of the insulating member.

10. The tantalum capacitor of claim 1, further comprising a conductive adhesive layer disposed between the tantalum body and the upper cathode pattern.

11. The tantalum capacitor of claim 10, wherein the conductive adhesive layer comprises an epoxy-based thermosetting resin and a conductive metal powder.

12. The tantalum capacitor of claim 1, wherein the transition region extends in a direction perpendicular to the first and second regions.

13. A tantalum capacitor, comprising:
a tantalum body including tantalum, and having a tantalum wire including a first region disposed in the tantalum body and a second region extending from one end surface of the tantalum body;
an insulating member, on which the tantalum body is disposed;
an encapsulation portion encapsulating the tantalum body;
an anode terminal including an upper anode pattern disposed on an upper surface of the insulating member and connected to the tantalum wire, a lower anode pattern disposed on a lower surface of the insulating member, and an anode via electrode disposed in a first hole in the insulating member to connect the upper anode pattern and the lower anode pattern; and
a cathode terminal including an upper cathode pattern disposed on the upper surface of the insulating member and connected to the tantalum body, a lower cathode pattern disposed on the lower surface of the insulating member, and a cathode via electrode disposed in a second hole in the insulating member to connect the upper cathode pattern and the lower cathode pattern, wherein the second region of the tantalum wire includes a first portion and a second portion, the second portion being relatively proximate to the anode terminal compared to the first region, the second portion having an upper surface stepped from an upper surface of the first portion, and wherein the second region of the tantalum wire further includes a transition region connecting the first and second portions, the transition region having a thickness greater than those of the first and second portions.

14. The tantalum capacitor of claim 13, further comprising:
a first conductive adhesive portion connecting the tantalum wire to the upper anode pattern; and
a second conductive adhesive portion connecting the tantalum body to the upper cathode pattern.

15. The tantalum capacitor of claim 14, wherein each of the first and second conductive adhesive portions comprises an epoxy-based thermosetting resin and a conductive metal powder.

16. The tantalum capacitor of claim 14, wherein a portion of the first conductive adhesive portion is disposed in the first hole, and
a portion of the second conductive adhesive portion is disposed in the second hole.

17. The tantalum capacitor of claim 14, wherein the encapsulation portion encapsulates the first conductive adhesive portion and the second conductive adhesive portion.

18. The tantalum capacitor of claim 13, wherein the another region of the tantalum wire has an end portion bent toward the upper anode pattern.

19. The tantalum capacitor of claim 13, wherein each of a width of the upper anode pattern and a width of the lower anode pattern is narrower than a width of the insulating member.

20. The tantalum capacitor of claim 13, wherein each of a width of the lower anode pattern and a width of the lower cathode pattern is narrower than a width of the insulating member.

21. The tantalum capacitor of claim 13, wherein the transition region extends in a direction perpendicular to the first and second portions.

* * * * *

UNITED STATES PATENT AND TRADEMARK OFFICE
CERTIFICATE OF CORRECTION

| | |
|---|---|
| PATENT NO. | : 11,322,309 B2 |
| APPLICATION NO. | : 16/881189 |
| DATED | : May 3, 2022 |
| INVENTOR(S) | : Hun Chol Jung et al. |

It is certified that error appears in the above-identified patent and that said Letters Patent is hereby corrected as shown below:

On the Title Page

Item (72), delete "Hun Choi Jung" and insert -- Hun Chol Jung --.

Signed and Sealed this
Fifth Day of July, 2022

Katherine Kelly Vidal
*Director of the United States Patent and Trademark Office*